United States Patent [19]
Wang

[11] Patent Number: 5,659,612
[45] Date of Patent: Aug. 19, 1997

[54] MOBILE TELEPHONE HOLDER

[76] Inventor: Chin-Yang Wang, No. 167, Lane 131, Sec. 2, Ture Hsing Rd., Panchiao City, Taipei Hsien, Taiwan

[21] Appl. No.: 642,261

[22] Filed: May 3, 1996

[51] Int. Cl.[6] ................................................ H04M 1/00
[52] U.S. Cl. ...................... 379/446; 379/447; 379/428; 379/426
[58] Field of Search ......................... 379/446, 447, 379/428, 426, 449, 450, 454, 455; 455/90, 89, 351, 345, 297; 248/222.11, 222.13, 222.12; 361/807, 809, 814

[56] References Cited

U.S. PATENT DOCUMENTS

| | | |
|---|---|---|
| 4,845,738 | 7/1989 | Takano ........................... 455/90 |
| 5,187,744 | 2/1993 | Richter .......................... 379/449 |
| 5,305,381 | 4/1994 | Wang et al. ..................... 379/454 |

*Primary Examiner*—Ahmad F. Matar
*Assistant Examiner*—Keith Ferguson
*Attorney, Agent, or Firm*—Bacon & Thomas

[57] ABSTRACT

A mobile telephone holder having a bottom wall, two opposite upright side walls bilaterally raised from the bottom wall at right angles, and two clamping structures disposed at the upright side walls for holding down a mobile telephone on the bottom wall, wherein each clamping structure includes an opening formed in one upright side wall, a wheel axle mounted in the opening in parallel to the bottom wall, and a clamping wheel rotatably mounted on the wheel axle and suspended in the opening for clamping the loaded mobile telephone.

5 Claims, 3 Drawing Sheets

MOBILE TELEPHONE HOLDER

BACKGROUND OF THE INVENTION

The present invention relates to mobile telephone holders, and relates more particularly to such a mobile telephone holder which comprises two openings in two opposite upright side walls, and two resilient clamping wheels suspending in the openings and adapted to hold down the loaded mobile telephone.

Regular mobile telephone holders commonly comprise a holder base, a fixed upright clamping plate and a movable upright clamping plate respectively disposed at two opposite sides of the holder base. The movable upright clamping plate is fastened to the holder base by spring means, which pulls the movable upright clamping plate toward the fixed clamping plate. During the loading of the mobile telephone, the surface of the polymeric shell of the mobile telephone tends to be damaged by the mobile clamping plate. Furthermore, because the lateral walls of regular mobile telephones are not made completely flat, they cannot be firmly retained in between the two upright clamping plates.

SUMMARY OF THE INVENTION

The present invention has been accomplished to provide a mobile telephone holder which eliminates the aforesaid drawbacks. According to one aspect of the present invention, a mobile telephone holder comprises two clamping structures respectively disposed at two opposite fixed upright side walls of the holder base thereof and adapted to hold down the mobile telephone, wherein each clamping structure comprises an opening formed in one upright side wall, a wheel axle mounted in the opening in parallel to the bottom wall, and a clamping wheel turned about the wheel axle and suspending in the opening and adapted to clamp on the loaded mobile telephone. According to another aspect of the present invention, axle holders are made at one side of the opening to hold the two opposite ends of the respective wheel axle, and springy arms are made at an opposite side of the opening to down down the wheel axle.

DETAILED DESCRIPTION OF THE PREFERRED EMBODIMENT

Figure 1:
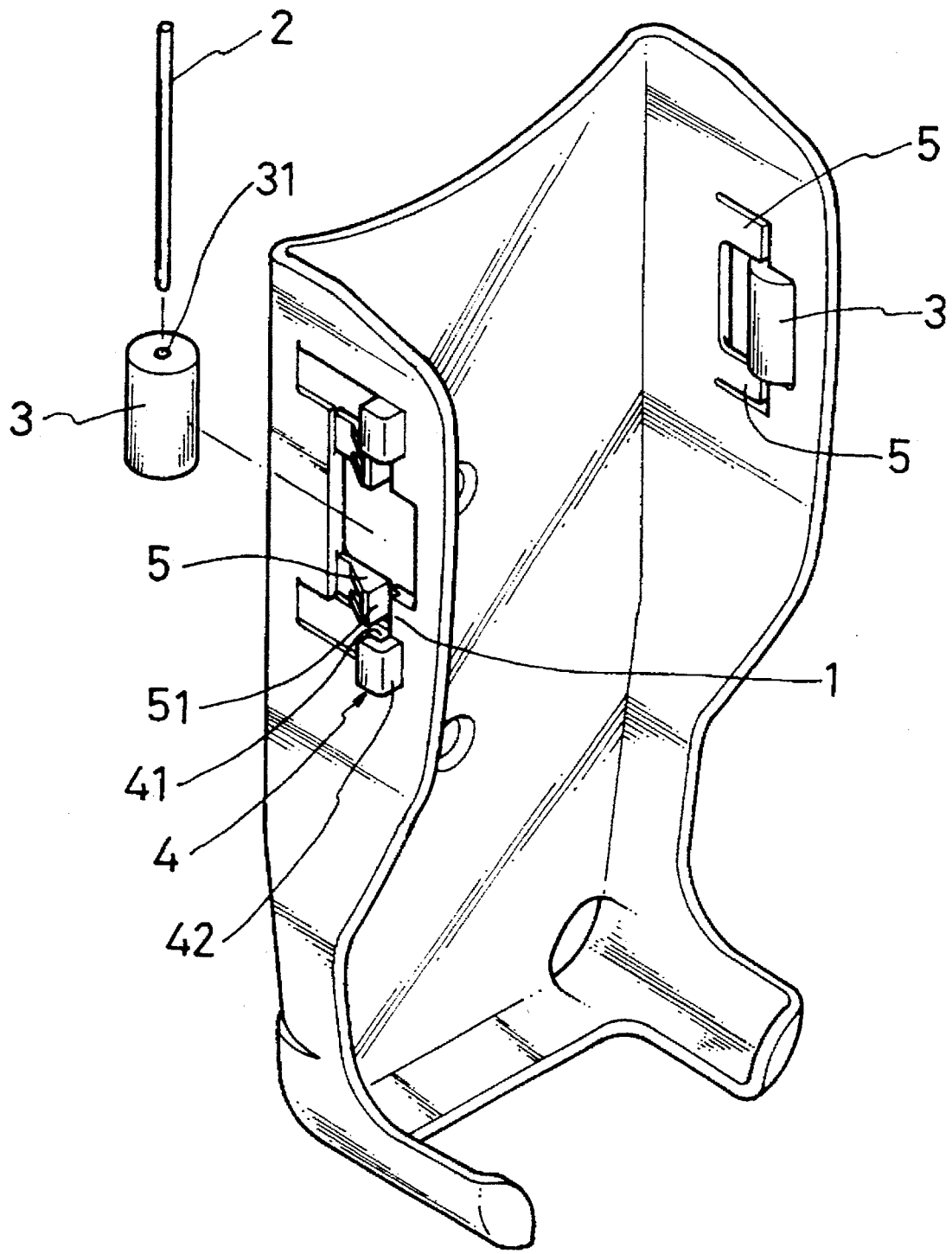
FIG. 1 is an exploded view of a mobile telephone holder according to one embodiment of the present invention.
Figure 2:
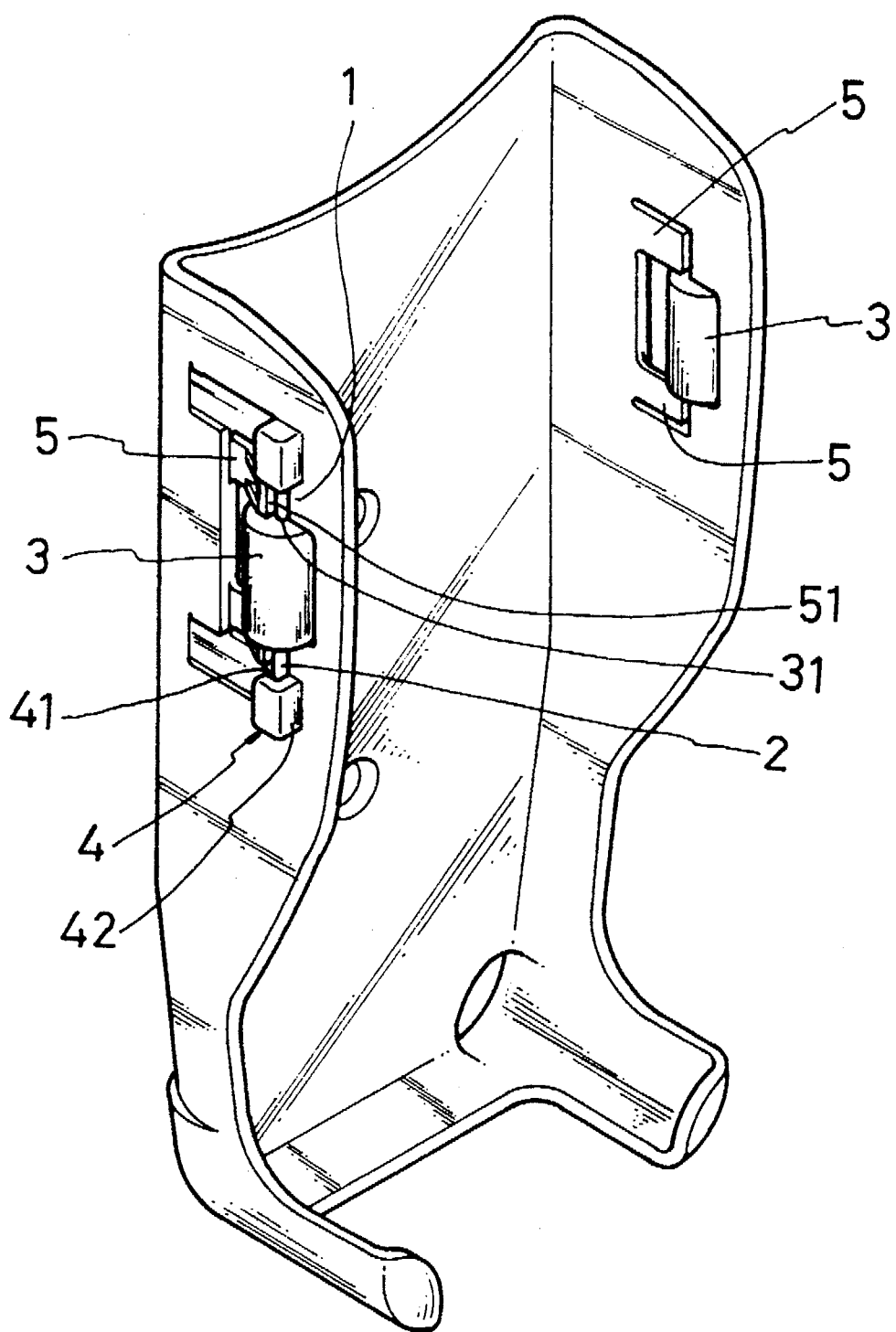
FIG. 2 is an elevational assembly view of the mobile telephone holder shown in FIG. 1; nd

Referring to FIGS. 1 and 2, in a mobile telephone holder having a horizontal bottom wall and two opposite upright side walls, two clamping structures are respectively disposed at the two opposite upright side walls, each clamping structure comprising an opening 1, a wheel axle 2, a clamping wheel 3, two axle holders 4, and two springy arms 5. The opening 1 is formed in each upright side wall of the mobile telephone holder, and adapted for the mounting of the wheel axle 2 and the clamping wheel 3. The wheel axle 2 has preferably a circular cross section adapted to hold the clamping wheel 3 in the opening 1. The clamping wheel 3 has a cylindrical shape of smaller size than that of the opening 1, and a longitudinal center through hole 31 adapted for the passing of the wheel axle 2. The clamping wheel 3 is preferably made from resilient material. The axle holders 4 extend outwardly from two opposite ends of the exterior side of each opening 1, with each holder 4 being comprised of a holder frame 42 and a gap 41 defined in the holder frame 42 and facing the opening 1, in a direction towards the bottom wall, for holding one end of the wheel axle 2. The springy arms 5 extend from one side of each opening 1, with each arm 5 having an expanded tip 51 facing each axle holder 4.

Referring to FIGS. 1 and 2 again, when the wheel axle 2 is inserted through the longitudinal center through hole 31 of the clamping wheel 3, the wheel axle 2 is mounted in the opening 1 by inserting its two opposite ends into the gaps 41 of the axle holders 4, thus permitting the clamping wheel 3 to be suspended in the opening 1 and secured in place by the expanded tips 51 of the springy arms 5. When the mobile telephone is forced into the mobile telephone holder, the clamping wheels 3 of the two clamping structures are rotated and forced outwards, permitting the mobile telephone to pass to the bottom side of the mobile telephone holder. When installed, the two opposite upright side walls of the mobile telephone holder return to their former shape, causing the clamping wheels 3 to clamp on the mobile telephone, and therefore the mobile telephone is firmly retained in place.

Figure 3:
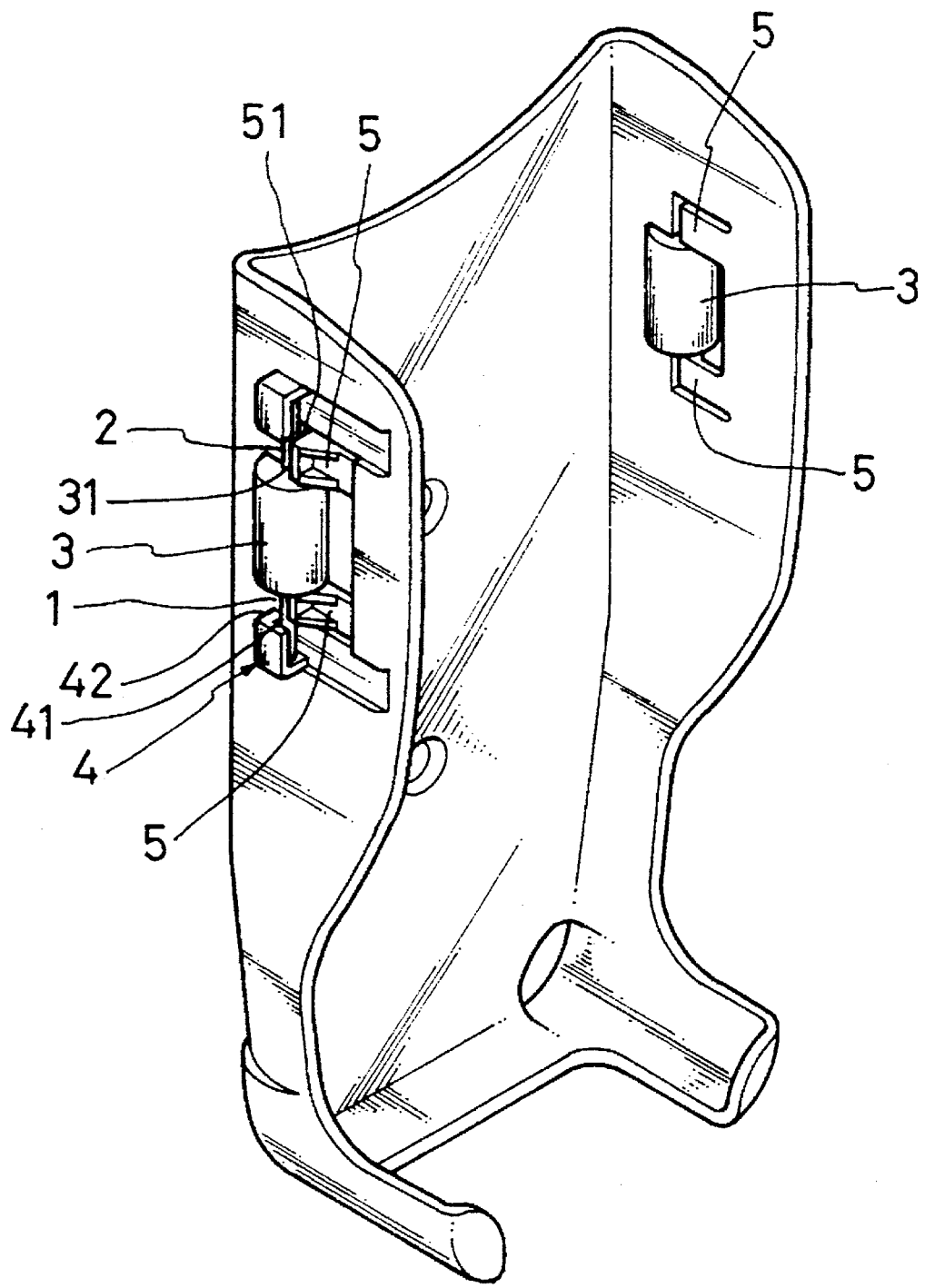
FIG. 3 is an elevational view of an alternate form of the present invention.

As an alternate form of the present invention, the positions of the axle holders 4 and the springy arms 5 may be reversed as shown in FIG. 3, in which case the gap of each axle holder 42 faces the opening 1 but in a direction away from the bottom wall. As another alternate form, two clamping wheels may be mounted around one wheel axle in the opening in one upright side wall of the mobile telephone holder, and one springy arm may be provided to hold down the wheel axle in place.

It is to be understood that the drawings are designed for purposes of illustration only, and are not intended as a definition of the limits and scope of the invention disclosed.

What the invention claimed is:

1. A mobile telephone holder comprising:

a) a bottom wall and a pair of opposed side walls extending from the bottom wall for defining a space therebetween to receive a mobile telephone;

b) at least one clamping structure carried by one side wall for securing the telephone in the space; and c) the clamping structure including an opening formed in the side wall, a pair of spaced holder frames disposed on an exterior side of the side wall adjacent a first side of the opening, each holder frame having a gap facing the opening, a pair of spaced springy arms extending inwardly from an opposite side of the opening, the arms each terminating in a tip, the tips facing the gaps of the holder frames, an axle having a pair of opposed ends secured within the gaps of the holder frames by the tips of the springy arms, and a clamping wheel rotatably mounted on the axle and suspended in the opening for clamping the telephone.

2. The mobile telephone holder of claim 1 further including a clamping structure carried by each side wall.

3. The mobile telephone holder of claim 1 wherein the clamping wheel is formed from resilient material.

4. The mobile telephone holder of claim 1 wherein the gaps face in a direction towards the bottom wall.

5. The mobile telephone holder of claim 1 wherein the gaps face in a direction away from the bottom wall.

* * * * *